United States Patent
Yoon et al.

(10) Patent No.: US 8,594,901 B1
(45) Date of Patent: Nov. 26, 2013

(54) ESTIMATING METHOD FOR TRANSMITTING TORQUE OF DRY TYPE CLUTCH IN VEHICLE

(71) Applicants: Hyundai Motor Company, Seoul (KR); Kia Motors Corp., Seoul (KR)

(72) Inventors: Young Min Yoon, Seoul (KR); Sung Hyun Cho, Suwon-si (KR); Ho Young Lee, Bucheon-si (KR); Seung Sam Baek, Jeju-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/794,260

(22) Filed: Mar. 11, 2013

(30) Foreign Application Priority Data

Oct. 30, 2012 (KR) .................. 10-2012-0121629

(51) Int. Cl.
*B60T 7/12* (2006.01)
(52) U.S. Cl.
USPC ............... 701/90; 701/68; 701/84; 192/70.3; 192/70.12; 192/70.17; 192/113.23; 192/147
(58) Field of Classification Search
USPC ............ 701/68, 84, 90; 192/3.25, 3.31, 3.26, 192/3.28, 3.33, 70.3, 70.12, 70.17, 113.23, 192/147; 74/330, 731.1, 650; 440/75
See application file for complete search history.

(56) References Cited

U.S. PATENT DOCUMENTS

| 4,574,926 A | * | 3/1986 | Bubak ......................... 192/18 A |
| 4,618,043 A | * | 10/1986 | Hattori et al. .................. 477/85 |
| 4,867,287 A | * | 9/1989 | Hayashi ...................... 192/21.5 |
| 4,969,545 A | * | 11/1990 | Hayashi ....................... 477/176 |
| 5,211,080 A | * | 5/1993 | Leising et al. ................ 475/123 |
| 5,282,401 A | * | 2/1994 | Hebbale et al. ............... 475/123 |
| 5,935,043 A | * | 8/1999 | Watanabe et al. ............. 477/169 |
| 8,332,111 B2 | * | 12/2012 | McDonnell et al. ............ 701/68 |
| 2012/0109477 A1 | * | 5/2012 | McDonnell et al. ............ 701/68 |
| 2013/0018556 A1 | * | 1/2013 | Williams et al. ............... 701/60 |

* cited by examiner

*Primary Examiner* — McDieunel Marc
(74) *Attorney, Agent, or Firm* — Morgan, Lewis & Bockius LLP

(57) ABSTRACT

An estimating method for transmitting torque of a dry type clutch in a vehicle, may include a slip determining step of determining by a processor whether only one clutch slips between an engine and a transmission, a transmitting torque estimating step of estimating a current transmitting torque of the dry type clutch by using a torque observer when the only one clutch slips as a result of performing the slip determining step, and an updating step of reflecting the current transmitting torque of the dry type clutch estimated in the transmitting torque estimating step and an actuator torque in the transmitting torque estimating step to a T-S (Torque-Stroke) curve.

4 Claims, 3 Drawing Sheets

$$J_e \dot{\omega}_e = T_e(\omega_e, \alpha) - T_c$$

$\alpha$ : Throttle Angle $\omega_e$ : Engine Speed $T_e$ : Engine Torque $J_e$ : Moment of Engine Inertia $T_c$ : Clutch Torque

ESTIMATING METHOD FOR TRANSMITTING TORQUE OF DRY TYPE CLUTCH IN VEHICLE

CROSS-REFERENCE TO RELATED APPLICATION

The present application claims priority to Korean Patent Application No. 10-2012-0121629, filed on Oct. 30, 2012, the entire contents of which is incorporated herein for all purposes by this reference.

BACKGROUND OF THE INVENTION

1. Field of the Invention

The present invention relates to a technology that estimates transmitting torque of a dry type clutch disposed between an engine and a transmission of a vehicle, and more particularly, to a technology that can accurately estimate the relationship between an operating stroke of an actuator and the transmitting torque of the dry type clutch so as to appropriately control the dry type clutch used in an automated transmission such as an automated manual transmission (AMT), and the like by means of the actuator.

2. Description of Related Art

An automated manual transmission such as an AMT (Automated Manual Transmission), or a DCT (Dual-Clutch Transmission), which is a system that automatically controls a manual transmission mechanism, transmits engine torque to a shift mechanism by using a dry type clutch unlike a common A/T using a torque converter and a wet type multi-plate clutch.

The dry type clutch has a characteristic in which transmitting torque of the dry type clutch is significantly changed according to numerous factors such as single part tolerance of components and abrasion caused by durability progress, thermal deformation by high temperature and a change in friction coefficient of a disk, and the like, and as a result, it is difficult to estimate torque transmitted to the dry type clutch while driving.

The dry type clutch is controlled by an actuator and in general, the actuator is controlled by a T-S (Torque-Stroke) curve illustrating a change in transmitting torque of the dry type clutch to a stroke of the actuator illustrated in FIG. 1. As described above, since transmitting torque of the dry type clutch is significantly changed due to various reasons, when the change in transmitting torque cannot be known and normally reflected while controlling the dry type clutch, excessive slip of the dry type clutch may occur or a shock may be caused, and as a result, an algorithm that estimates a torque characteristic of the dry type clutch in real time is required.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an estimating method for transmitting torque of a dry type clutch in a vehicle that can appropriately estimate a change in characteristic of transmitting torque to an actuator stroke of the dry type clutch even while a vehicle is driven to secure a smooth shift feel by preventing a shift shock through more appropriate control of the dry type clutch and secure durability of the dry clutch.

In an aspect of the present invention, an estimating method for transmitting torque of a dry type clutch in a vehicle, may include a slip determining step of determining by a processor whether only one clutch slips between an engine and a transmission, a transmitting torque estimating step of estimating a current transmitting torque of the dry type clutch by using a torque observer when the only one clutch slips as a result of performing the slip determining step, and an updating step of reflecting the current transmitting torque of the dry type clutch estimated in the transmitting torque estimating step and an actuator torque in the transmitting torque estimating step to a T-S (Torque-Stroke) curve.

In the slip determining step, in the case of the vehicle mounted with a DCT (Dual Clutch Transmission), only when any one of two clutches constituting the DCT is fully opened and the other one slips, it is determined that the only one clutch slips.

In the transmitting torque estimating step, the current transmitting torque of the dry type clutch is estimated by using an engine torque and an engine speed of the engine through a vehicle driving system model relationship equation of $J_e \dot{\omega}_e = T_e(\omega_e, \alpha) - T_c$, wherein $\alpha$ is throttle angle, $\omega_e$ is the engine speed, $T_e$ is the engine torque, $J_e$ is moment of engine inertia, and $T_c$ is clutch torque, and through a torque observer model relationship equation of $$\dot{\hat{\omega}}_e = \frac{1}{J_e} T_e - \frac{1}{J_e} \hat{T}_c + l_0(\omega_e - \hat{\omega}_e),$$

and $$\dot{\hat{T}}_c = -l_1(\omega_e - \hat{\omega}_e) - \int_0^\tau l_2(\omega_e - \hat{\omega}_e) d\tau$$

wherein $\hat{\omega}_e$ is estimated engine speed, $\hat{T}_c$ is estimated clutch torque, and $l_0, l_1, l_2$ are observer gains.

The estimating method for transmitting torque of the dry type clutch may further include a data storing step of storing the current transmitting torque of the dry type clutch estimated in the transmitting torque estimating step and an actuator stroke in the transmitting torque estimating step, between the transmitting torque estimating step and the updating step.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
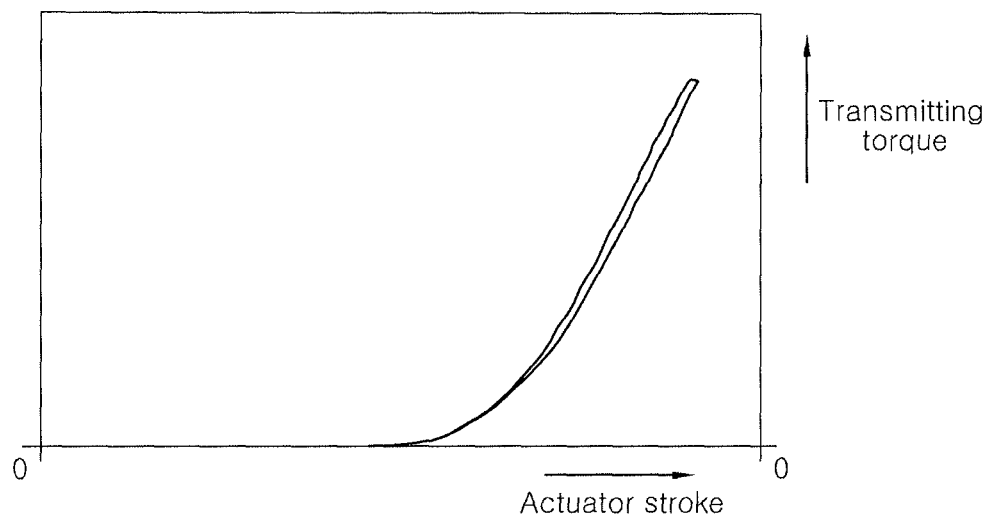
FIG. 1 is an example of a T-S curve illustrating a change in transmitting torque of a dry type clutch to a stroke of an actuator.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Figure 2:
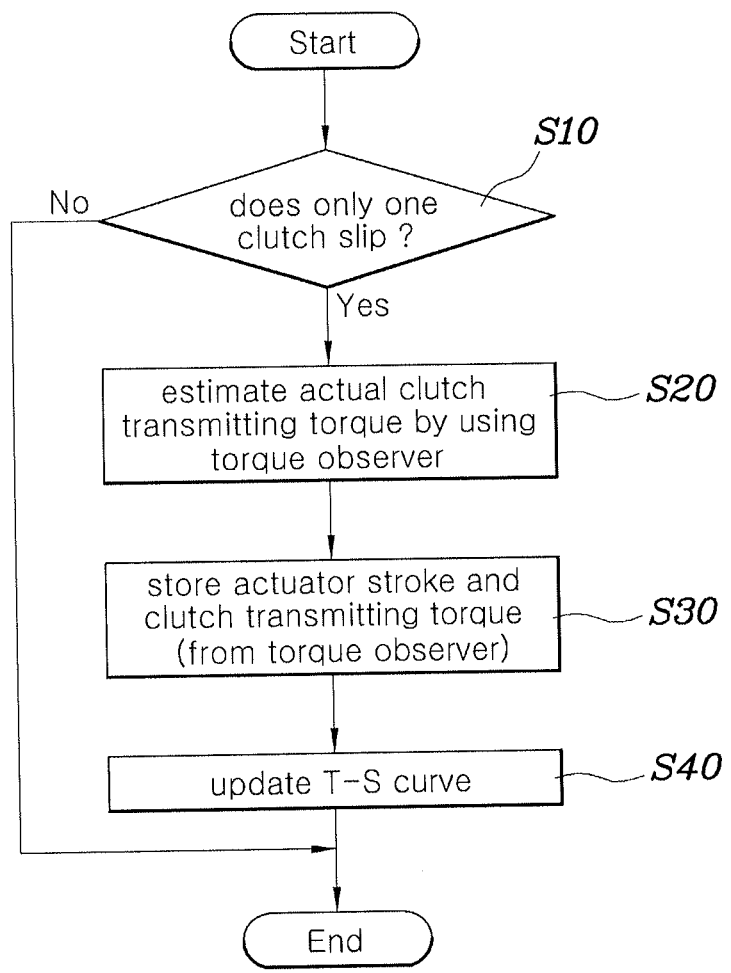
FIG. 2 is a flowchart illustrating an exemplary embodiment of an estimating method for transmitting torque of a dry type clutch in a vehicle according to an exemplary embodiment of the present invention.

Referring to FIG. 2, an estimating method for transmitting torque of a dry type clutch in a vehicle includes, a slip determining step (S10) of determining by a processor whether only one clutch slips between an engine and a transmission, a transmitting torque estimating step (S20) of estimating the current transmitting torque of the clutch by using a torque observer when only one clutch slips as a result of performing the slip determining step (S10), an updating step (S40) of reflecting the transmitting torque of the clutch estimated in the transmitting torque estimating step (S20) and an actuator torque at that time to a T-S curve.

That is, in an exemplary embodiment of the present invention, when it is determined that one clutch slips by the slip determining step (S10), the transmitting torque of the clutch at that time is estimated by a mathematical model through the transmitting torque estimating step (S20) to update an existing T-S curve through the updating step (S40) by using the estimated transmitting torque and thereafter, the transmitting torque of the clutch is controlled with the actuator by using the new updated T-S curve to control the transmitting torque of the dry type clutch more accurately, and as a result, a shift shock is prevented and unnecessary slipping of the dry type clutch is prevented to improve a shift feel and durability of the dry type clutch.

In the slip determining step (S10), in the case of a vehicle mounted with a DCT, only when any one of two clutches constituting the DCT is fully opened and the other one slips, it is determined that the clutch slips.

Since it is difficult for the torque observer used in the transmitting torque estimating step (S20) to divide and estimate torques of both clutches under a situation in which two clutches of the DCT operate simultaneously, only one clutch slips.

Of course, in an exemplary embodiment of the present invention, since only one clutch may be used even in an AMT provided between the engine and the transmission, the limitation is meaningless in this case.

Figure 3:
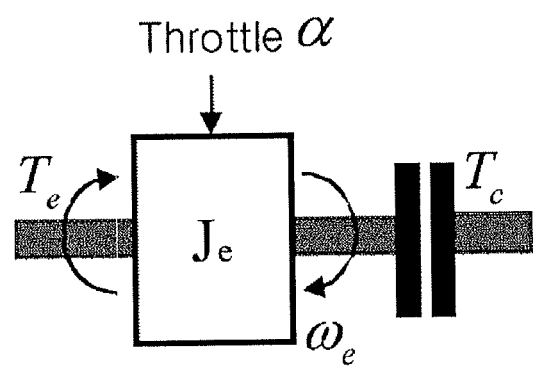
FIG. 3 is a diagram illustrating a vehicle driving system model used in an estimating step of transmitting torque and a relationship thereof according to an exemplary embodiment of the present invention.

In the transmitting torque estimating step (S20), the transmitting torque of the clutch is estimated by using the torque and the speed of the engine through the following relationship equation acquired from a vehicle driving system model illustrated in FIG. 3.

$$J_e \dot{\omega}_e = T_e(\omega_e, \alpha) - T_c \quad \text{[Equation 1]}$$

$\alpha$: Throttle Angle
$\omega_e$: Engine Speed
$T_e$: Engine Torque
$J_e$: Moment of Engine Inertia
$T_c$: Clutch Torque through the following torque observer model relationship equation.

$$\dot{\hat{\omega}}_e = \frac{1}{J_e} T_e - \frac{1}{J_e} \hat{T}_c + l_0(\omega_e - \hat{\omega}_e) \quad \text{[Equation 2]}$$

$$\dot{\hat{T}}_c = -l_1(\omega_e - \hat{\omega}_e) - \int_0^t l_2(\omega_e - \hat{\omega}_e) d\tau$$

$\hat{\omega}_e$: Estimated Engine Speed $\hat{T}_c$: Estimated Clutch Torque $l_0, l_1, l_2$: Observer Gain Meanwhile, the method further includes a data storing step (S30) of storing the transmitting torque of the clutch estimated in the transmitting torque estimating step (S20) and the actuator stroke at that time, between the transmitting torque estimating step (S20) and the updating step (S40).

Accordingly, by using the relationship between the actuator stroke stored in the data storing step (S30) and the transmitting torque of the clutch estimated by the torque observer as described above, the T-S curve illustrated in FIG. 1 is appropriately changed to be updated, and thereafter, the actuator stroke is controlled based on the updated T-S curve, thereby improving the shift feel through more accurate control of the dry type clutch ad secure durability of the dry type clutch.

According to an exemplary embodiment of the present invention, a change in characteristic of transmitting torque to an actuator stroke of the dry type clutch can be appropriately estimated even while a vehicle is driven to secure a smooth shift feel by preventing a shift shock through more appropriate control of the dry type clutch and secure durability of the dry clutch.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An estimating method for transmitting torque of a dry type clutch in a vehicle, comprising:
    a slip determining step of determining by a processor whether only one clutch slips between an engine and a transmission;
    a transmitting torque estimating step of estimating a current transmitting torque of the dry type clutch by using a torque observer when the only one clutch slips as a result of performing the slip determining step; and
    an updating step of reflecting the current transmitting torque of the dry type clutch estimated in the transmitting torque estimating step and an actuator torque in the transmitting torque estimating step to a T-S (Torque-Stroke) curve.

2. The estimating method for transmitting torque of the dry type clutch in the vehicle of claim 1, wherein
    in the slip determining step, in the case of the vehicle mounted with a DCT (Dual Clutch Transmission), only when any one of two clutches constituting the DCT is fully opened and the other one slips, it is determined that the only one clutch slips.

3. The estimating method for transmitting torque of the dry type clutch in the vehicle of claim 1, wherein
    in the transmitting torque estimating step, the current transmitting torque of the dry type clutch is estimated by using an engine torque and an engine speed of the engine through a vehicle driving system model relationship equation of $$J_e \dot{\omega}_e = T_e(\omega_e, \alpha) - T_c,$$

wherein $\alpha$ is throttle angle, $\omega_e$ is the engine speed, $T_e$ is the engine torque, $J_e$ is moment of engine inertia, and $T_c$ is clutch torque, and
   through a torque observer model relationship equation of $$\dot{\hat{\omega}}_e = \frac{1}{J_e} T_e - \frac{1}{J_e} \hat{T}_c + l_0(\omega_e - \hat{\omega}_e),$$

and $$\dot{\hat{T}}_c = -l_1(\omega_e - \hat{\omega}_e) - \int_0^\tau l_2(\omega_e - \hat{\omega}_e) d\tau$$

wherein $\hat{\omega}_e$ is estimated engine speed, $\hat{T}_c$ is estimated clutch torque, and $l_0, l_1, l_2$ are observer gains.

4. The estimating method for transmitting torque of the dry type clutch in the vehicle of claim 1, further including:
    a data storing step of storing the current transmitting torque of the dry type clutch estimated in the transmitting torque estimating step and an actuator stroke in the transmitting torque estimating step, between the transmitting torque estimating step and the updating step.

* * * * *